ALTERNATING CURRENT STATIC SWITCH

Filed June 8, 1965 2 Sheets-Sheet 1

INVENTORS
KARL LENNART GREES
JÖRGEN GUSTAFSSON
BÖRJE ALLAN JOHANSSON

BY
Bailey, Stephens + Huettig
ATTORNEYS

ALTERNATING CURRENT STATIC SWITCH

Filed June 8, 1965 2 Sheets-Sheet 2

INVENTORS
KARL LENNART GREES
JÖRGEN GUSTAFSSON
BÖRJE ALLAN JOHANSSON

BY
Bailey, Stephens & Huettig
ATTORNEYS

United States Patent Office 3,412,262

Patented Nov. 19, 1968

3,412,262
ALTERNATING CURRENT STATIC SWITCH

Karl Lennart Grees, Irsta, and Jörgen Gustafsson, and Börje Allan Johanssan, Vasteras, Sweden, assignors to Allmänna Svenska Elektriska Aktiebolaget, Vasteras, Sweden, a Swedish corporation Filed June 8, 1965, Ser. No. 462,275
Claims priority, application Sweden, June 22, 1964, 7,564/64
5 Claims. (Cl. 307—225)

ABSTRACT OF THE DISCLOSURE

An AC static switch for three-phase networks and comprising switching units for at least two phases. Each switching unit comprises two reverse-parallel-connected rectifiers, of which at least one is a thyristor. To turn on the thyristor at the time of zero current crossover and without regard to the load power factor, a capacitor is connected in series with a transistor between the gate and the cathode of the thyristor. Charging current to the capacitor is taken from the network and is supplied through a control device from a feed point which is common to all switching units.

Figure 1:
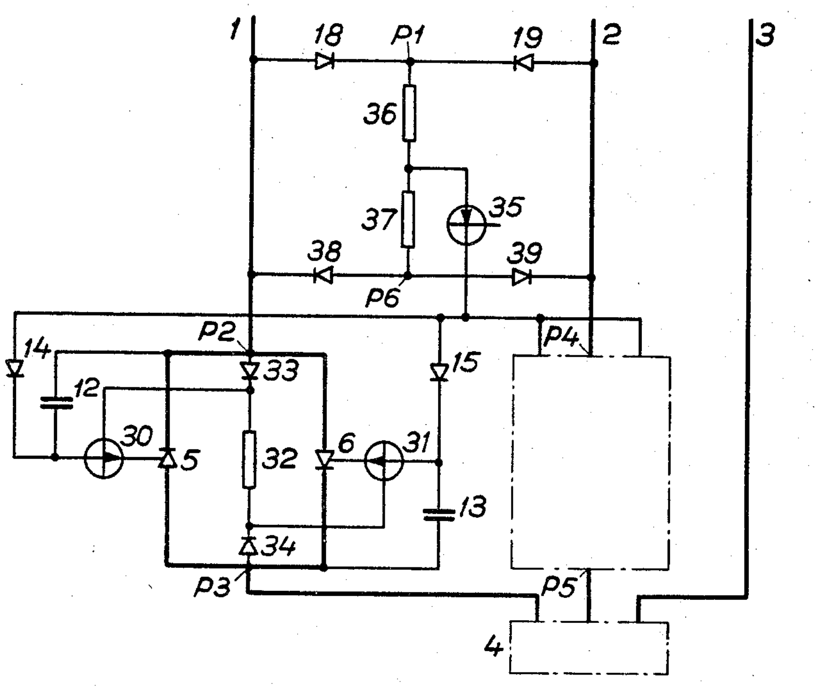

The present invention relates to an A.C. static switch based upon the utilization of silicon controlled rectifiers or so-called thyristors. Controllable semi-conductor rectifiers of the thyristor type have made possible the manufacture of switches with in many respects considerably better properties than conventional switches with mechanically operating contacts. A thyristor switch has for example a considerably longer life than a conventional switch, since the thyristor switch does not have any moving parts which can be exposed to wear. Besides it is completely silent and also many more of the problems which are associated with mechanical switches are avoided, such as burning off of material because of arcs, oxidising and contamination of the contact surfaces, contact bounce and faulty operation at shocks and vibrations.

The present invention refers to such a static switch for A.C. networks which contains at least two reverse-parallel-connected semi-conductor rectifiers of which at least one is discontinuously controllable by a gate electrode. A problem in the construction of switches of this type is how the controllable semi-conductor rectifier can be fed in a simple way with the gate current necessary for firing at the moment when the load current passes through zero. The switch should of course be usable for inductive as well as for capacitive loading and a firing current in phase with the voltage of the feeding network is therefore not sufficient. According to the invention, this problem is solved, for firing of said controllable rectifier by connecting a circuit containing a capacitor series-connected with a controllable semi-conductor element between the gate electrode and the cathode of said rectifier, which capacitor for the purpose of charging is intended to be connected through a control device to a point in the A.C. network which at least temporarily is at a higher potential than said cathode. A firing circuit which is made in this way has the advantage that sufficient energy for the firing of the thyristor can be stored in the capacitor and be immediately accessible when the load current passes through zero, regardless of the phase angle of the current. By suitably controlling the semi-conductor element series-connected with the capacitor, it is also possible to make the energy consumption in the firing circuit particularly small. This control is produced with advantage by means of the voltage drop across the reverse-parallel-connected rectifiers through an impedance element arranged in a branch parallel to said rectifiers. The energy consumption in the firing circuit can further be reduced if this impedance element contains an auxiliary capacitor which recharges with inverse polarity when the load current changes direction. During the recharging of said auxiliary capacitor a current pulse is fed to the control circuit of the controllable semi-conductor element so that a firing pulse of short duration is fed to the thyristor from the firing capacitor.

A switch according to the invention is particularly usable as a motor circuit breaker during severe operating conditions at a high frequency of operations. For turning off the switch in such a case, it is suitable to arrange a mechanical contact in said control device between the capacitor and the A.C. network. This contact can for example in a three phase switch be controlled from a three-pole thermic overcurrent relay which is influenced by the current in the phase conductors. In certain cases it is suitable for said control device to consist of a controllable semi-conductor element, for example a transistor. The switch will then not have any moving parts.

A thryistor switch intended for a three-phase system can either be two-pole or three-pole. With a two-pole construction the switching function can be carried out in only two of the three phases of the network. This is however no disadvantage since a thyristor switch in disconnected position is nevertheless not capable of completely isolating the load from the current supply, depending on the reverse leakage current of the semi-conductor in the blocking state. In a three-pole thyristor switch the main circuit for the switching units in each pole usually consists of a thyristor reverse-parallel-connected with a diode, while in a two pole three-phase switch each pole contains two reverse-parallel-connected thyristors.

Figure 2:
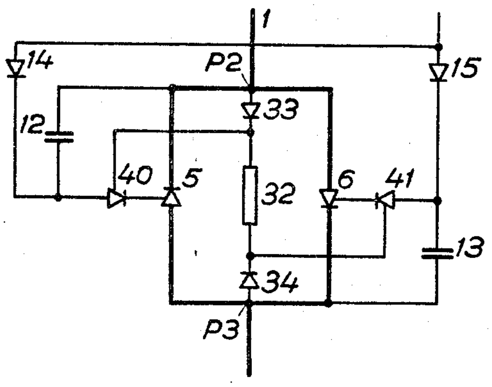
Figure 3:
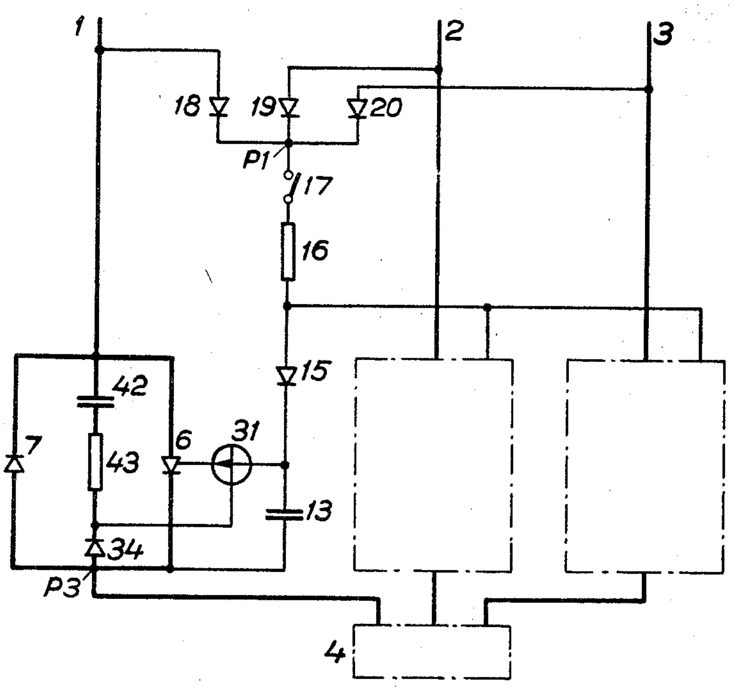
Figure 4:
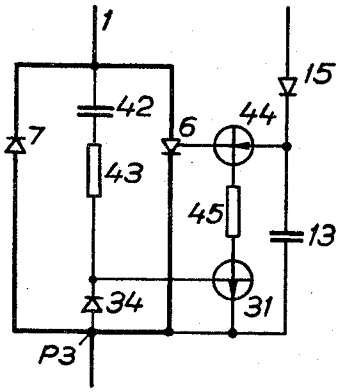

The accompanying drawing shows examples of connection diagrams for different embodiments of the invention, where FIG. 1 shows a diagram of a two-pole three-phase switch, FIG. 2 shows an alternative construction of one pole of a switch according to FIG. 1, FIG. 3 shows an embodiment of a three-pole three-phase switch and FIG. 4 shows an alternative diagram for one pole of a three-phase switch according to FIG. 3. Analogous circuit elements in different figures are given the same designation.

In FIG. 1, the numbers 1, 2 and 3 designate the three phase conductors in a three-phase system, of which the conductors 1 and 2 are connected to a load impedance 4 by a two-pole switch, while the phase winding 3 is directly connected to the load. Each pole of the switch consists of a switching unit containing two reverse-parallel-connected thyristors 5 and 6. The switching units in the two phases are identical, which is why only the switching unit in phase 1 is shown in detail. The gate electrodes for each of the thyristors 5 and 6 are connected through transistors 30 and 31 to capacitors 12 and 13 respectively, and other plate of the capacitors is connected to the cathode of each of said thyristors. For the control of the transistors 30 and 31, an impedance element 32 is arranged in a branch connected parallel to the thyristors. Additionally in this branch two opposite connected diodes 33 and 34 are arranged. The switch according to FIG. 1 is controlled by means of a transistor 35 of PNP-type. Charging current to the capacitors 12 and 13 is supplied through a voltage divider consisting of resistors 36 and 37 connected between the phase conductors 1 and 2 over the diodes 18, 19, 38 and 39. The resistors 36 and 37 are adjusted so that the capacitors 12 and 13 are supplied with a suitable charging voltage.

The arrangement according to FIG. 1 operates in the following way:

Through the diodes 18 and 19, the point P1 will be at the highest potential of the phases 1 and 2. Through the diodes 38 and 39, the point P6 will in a similar way be at the lowest potential of these phases. When the thyristors are in the on-state, therefore, the point P6, disregarding the voltage drop across the thyristors, will be at the same potential as that one of points P2, P3 and P4, P5 respectively, which at the moment has the lowest potential. The switch is closed by means of a control current fed to the transistor 35 from an operating circuit not shown. In that phase of phases 1 and 2 which at the moment has the lowest potential, the capacitors 12 and 13 will be charged to a certain voltage which is determined by the voltage division between the resistors 36 and 37. The capacitors 12 and 13 function as energy accumulators from which the necessary energy for firing the thyristors 5 and 6 can be supplied. Through suitable dimensioning of the circuit elements sufficient current and voltage for the firing of the thyristors can be made available when the respective phase current passes through zero, regardless of the phase angle of the load current. The diodes 14 and 15 prevent the capacitors 12 and 13 respectively from discharging across the remaining circuit connections when the potential at the points P2 and P3 rises.

The transistors 30 and 31 are controlled by means of the voltage drop across the thyristors. If for example the voltage is such that the thyristor 5 is to fire, the transistor 30 will be supplied with control current over the diode 34 and the impedance element 32, and firing current fed to the thyristor 5 from the capacitor 12. During the half periods when the thyristor 5 is not conducting, the transistor 30 does not receive any control current, so that the capacitor 12 does not discharge. The impedance element 32 can be resistive, inductive or capacitive and is dimensioned so that the transistors 30 and 31 receive a suitable control current. Instead of the resistor 37, a Zener diode can be used having a suitable Zener voltage compared to the firing voltage of the thyristors.

In FIG. 2 is shown an embodiment of a switching unit for a switch where the capacitors 12 and 13 are connected to the firing electrodes for the thyristors 5 and 6 respectively by small auxiliary thyristors 40 and 41 respectively. These thyristors receive their firing current in the same way as the transistors 30 and 31 according to FIG. 1.

In FIG. 3 is shown a connection diagram for a three-pole three-phase thyristor switch. The three conductors 1, 2 and 3 of the three-phase system are each connected to the load impedance 4 by one pole of the switch. Each switch pole consists of a switching unit whose main circuit consists of two reverse-parallel-connected semi-conductor rectifiers. In phase 1 these rectifiers are designated by 6 and 7 and of these the rectifier 6 is a thyristor, while the rectifier 7 is a non-controllable semi-conductor diode. The switching units in the phases 2 and 3 agree completely with the arrangement in phase 1, so only the last mentioned is described in the following. Between the gate electrode and the cathode of the thyristor 6, a capacitor 13 is connected in series with a transistor 31 of NPN-type. For charging of the capacitor 13 this is connected to the phase windings 1, 2 and 3 over the diodes 18, 19 and 20, the control device 17, the resistor 16 and the diode 15. For controlling the transistor 31 a parallel branch between the anode and the cathode of the thyristor 6 is arranged, consisting of a capacitor 42, a resistor 43 and a diode 34. The capacitor 42 and resistor 43 corresponds to the impedance element 32 shown in FIGS. 1 and 2.

The arrangement according to FIG. 3 operates in the following way:

Through the diodes 18, 19 and 20, the point P1 will be at the same potential as that of the phase conductors 1, 2 and 3 which at the moment is at the highest potential. To turn the switch on, the control device 17 is closed. The capacitor 13 is thereby charged during the time interval when the point P3 is at a lower potential than the point P1, so that the upper plate of the capacitor 13 becomes positive. If the direction of the current in phase 1 is such that diode 7 conducts, the capacitor 42 will be charged over the diode 34 and the resistor 43 to a voltage corresponding to the forward voltage drop of the diode 7 and with plus on the lower plate of the capacitor. When the direction of current in phase 1 changes, the capacitor 42 will be recharged with inverse polarity whereupon a current flows to the base emitter circuit of the transistor 31. The thyristor 6 is thereby fired with a current pulse from the charged capacitor 13. When the capacitor 42 is recharged corresponding to the forward voltage drop across the thyristor 6, the transistor 31 is no longer supplied with control current, so that it blocks any further discharging of the capacitor 13. Through this arrangement the firing current delivered from the capacitor 13 receives the form of a short current pulse at the beginning of each half period when the thyristor 6 is to conduct. The power consumption of the firing circuit for the arrangement according to FIG. 3 is therefore relatively small. The diode 15 prevents the capacitor 13 from being discharged through the switching units in the remaining phases. To turn off the switch, the connection device 17 is opened, so that the capacitor 13 no longer receives charging current. The control device 17 can be controlled in different ways, for example turn-off may be achieved by means of a bi-metal relay which is influenced by the current in the phase conductors.

The characteristic data of the available semi-conductor elements can be such that a connection according to FIG. 4 is more suitable than that shown in FIG. 3. In the arrangement according to FIG. 4 the transistor 31 is used for controlling a transistor 44 of PNP-type, which in its turn connects the capacitor 13 to the gate electrode of the thyristor 6. A resistor 45 limits the control current for the transistor 44. The transistor 31 is controlled in the same way as in the arrangement according to FIG. 3.

The feeding voltage to the capacitors 12 and 13 in two-pole three-phase switches can be taken out from the phase conductors of the A.C. network in different ways. These feeding circuits do not depend on how the firing from the capacitors is fed to the thyristors 5 and 6 and a plurality of combinations of feeding and firing circuits are therefore feasible. For example with the connection according to FIG. 1 the resistor 37 and the diodes 38 and 39 can be dispensed with and the transistor 35 can be replaced by high-ohmic resistors. The point P1 can also be connected to a possible neutral conductor of the feeding network or to an artificial zero point. The mode of operation of the switch is then the same, but the potential in the point P1 will of course have values other than those given above. The feeding circuits for three-pole three-phase switches, for example that shown in FIG. 3, can be made in a corresponding way.

Even though the described embodiments of the invention only refer to three-phase switches, the switching units of the type shown with two reverse-parallel-connected thyristors can also be used in single-phase circuits.

What is claimed is:

1. An alternating current static switch for a three-phase electric network, said switch comprising at least two switching units for connection in separate phases of said network, each of said switching units comprising two solid state reverse-parallel-connected rectifiers, the first of said rectifiers having a cathode and a gate electrode for discontinuous control thereof, a firing means for actuating said gate electrode at the time of zero current, crossover, said firing means comprising a capacitor for supplying firing current to said gate electrode, said capacitor having a first and a second plate, said first plate being connected to the cathode of said first rectifier, a controllable semi-conductor element connecting said second plate to said gate electrode, a control means for said controllable semi-conductor element, a charging means for said capacitor, said charging means comprising an auxiliary rectifier and a control device for turning said switch on and off, said auxiliary rectifier and said control device being electrically connected in series between said second plate and a feed point, which is supplied with voltage from said network and at least once per alternating current cycle taking a higher potential than said cathode, said control device and said feed point being common to all switching units.

2. In an alternating current static switch according to claim 1, said control means for said semi-conductor element comprising an impedance means, said impedance means being electrically connected in parallel with said reverse-parallel-connected rectifiers.

3. In an alternating current static switch according to claim 2, said impedance means comprising an auxiliary capacitor and a resistor, said auxiliary capacitor and said resistor being electrically connected in series.

4. In an alternating current static switch according to claim 1, said control device being a mechanical contact.

5. In an alternating current static switch according to claim 1, said control device being a second controllable semi-conductor element.

References Cited

UNITED STATES PATENTS

| | | | |
|---|---|---|---|
| 2,728,886 | 12/1955 | Rohats | 328—81 |
| 3,097,314 | 7/1963 | Harriman | 328—81 |

ARTHUR GAUSS, *Primary Examiner.*

B. P. DAVIS, *Assistant Examiner.*